United States Patent Office 2,828,313
Patented Mar. 25, 1958

2,828,313
PRODUCTION OF 1.2-DIAMINOCYCLOHEXANES

Heinrich Scholz, Ludwigshafen (Rhine), and Paul Guenthert, Iggelheim, Germany, assignors to Badische Anilin- & Soda-Fabrik Aktiengesellschaft, Ludwigshafen (Rhine), Germany No Drawing. Application January 4, 1956
Serial No. 557,248

Claims priority, application Germany January 12, 1955

6 Claims. (Cl. 260—293)

This invention relates to a new and improved process for the production of 1.2-diaminocyclohexanes, especially of unsubstituted 1.2-diaminocyclohexane and of its substitution products which are substituted only at one of its nitrogen atoms by alkyl, cycloalkyl, aralkyl and/or aryl groups.

There has no hitherto been a method for the production of 1.2-diaminocyclohexanes which is useful for industrial purposes. A sequence of reactions starting from anthranilic acid (A. Einhorn and collaborators, Ber. deutsch. Chem. Ges. 27 (1894) and Liebigs Ann. Chem. 295, 207) gives only bad yields of unsubstituted 1.2-diaminocyclohexane. The reduction of ortho-nitroaniline or of 1.2-diaminobenzene also has not hitherto given satisfactory results.

As an initial material already containing the cyclohexane ring, 1.2-dinitrocyclohexane has recently acquired interest; because it can be prepared very simply by nitration of cyclohexane. Attempts to reduce it to 1.2-diaminocyclohexane with the usual chemical reducing agents, such as iron and hydrochloric acid or stannous chloride, have however been unsuccessful. If an attempt is made to hydrogenate 1.2-dinitrocyclohexane catalytically in an autoclave, inhomogeneous products are obtained which consist for the most part of high molecular weight substances of unknown constitution.

We have now found that 1.2-diaminocyclohexanes are obtained in good yields by leading 1.2-dinitrocyclohexane in the liquid phase with an excess of hydrogen and of ammonia or of a primary or secondary amine continuously at about 50° to 200° C. under a pressure of about 100 to 300 atmospheres over a hydrogenation catalyst.

Suitable hydrogenation catalysts are for example metallic cobalt and nickel which have been obtained by reduction of the corresponding oxides, and also those which contain nickel or cobalt precipitated on carriers such as aluminum oxide. Indifferent diluents, such as methanol, ethanol, tetrahydrofurance or dioxane, may also be coemployed.

Suitable amines are for example mono- and dimethylamine, mono- and di-ethylamine, mono- and dibutylamines, dodecylamine, didodecylamine, cyclohexylamine, N-methyl- and N-ethylcyclohexylamine, and also pyrrolidine, piperidine, hexamethylene imine, morpholine, piperazine, aniline, N-methyl- and N-ethyl-aniline, benzylamine, phenylpropylamine, mono- and diethanolamine, ethylene diamine or alpha-aminopyridine.

In this way there are obtained very simply and in almost quantitative yields products from which very pure 1.2-diaminocyclohexanes can be recovered by a single fractional distillation.

The reaction may be reproduced as follows in the case of using dimethylamine:

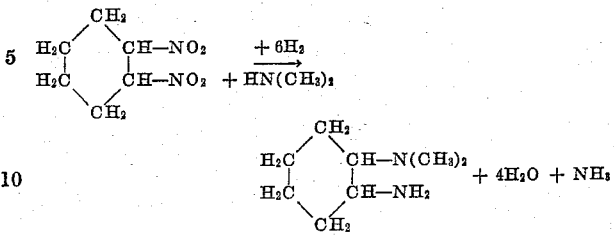

The amines formed can be recovered from the reaction mixture very simply in pure form and in excellent yields by distillation.

It is surprising that by the use of primary or secondary amines instead of ammonia, the 1.2-diaminocyclohexanes substituted on only one of the two nitrogen atoms are formed. Such compounds have hitherto been inaccessible or only accessible by troublesome methods.

The 1.2-diaminocyclohexanes are valuable intermediate products, especially for complex-forming agents, dyestuffs, textile assistants, oil assistants, fungicides, insecticides and pharmaceutical products.

The following examples will further illustrate this invention but the invention is not restricted to these examples. The parts are parts by weight.

Example 1

A solution of 300 parts of 1.2-dinitrocyclohexane in 2500 parts of liquid ammonia per hour and hydrogen are pumped continuously through a hydrogenation chamber 1.6 metres long and 4.4 centimetres in internal width filled with pellets of reduced cobalt or nickel oxide. The chamber is heated to 70° to 110° C. and the pressure is adjusted to about 250 atmospheres. By distillation of the reaction product, pure 1.2-diaminocyclohexane of the boiling point 87° C. at 22 mm. Hg is obtained in a yield of about 90 percent of the theoretical yield. The ammonia can be reused after separating the water formed.

Example 2

A mixture of 300 parts of 1.2-dinitrocyclohexane, 800 parts of methanol and 1900 parts of liquid ammonia per hour is led with hydrogen under a pressure of about 250 atmospheres at a temperature of 70° to 110° C. through the apparatus described in Example 1. By fractional distillation of the reaction product, very pure 1.2-diaminocyclohexane is obtained in a yield of about 85 percent of the theoretical yield.

Dioxane or tetrahydrofurane may be used instead of methanol with a similar result.

Example 3

250 parts of a distillation residue from the industrial production of nitrocyclohexane by nitration of cyclohexane with nitric acid, which contains considerable amounts of 1.2-dinitrocyclohexane, are dissolved in 2500 parts of liquid ammonia. This solution is pumped within an hour together with hydrogen at about 250 atmospheres pressure through a chamber 1.6 metres long and 4.35 centimetres in internal width filled with pellets of reduced cobalt or nickel oxide and heated to 55° to 115° C.

By fractional distillation of the hydrogenation mixture, obtained continuously, cyclohexylamine passes over as first runnings. The bulk consists of pure 1.2-diaminocyclohexane of the boiling point 87° C. at 22 mm. Hg. The last runnings consist of polyamino compounds of unknown constitution.

*Example 4*

A solution of 300 parts of 1.2-dinitrocyclohexane in 2500 parts of liquid dimethylamine is pumped per hour together with hydrogen under a pressure of 250 atmospheres and at 80° to 140° C. through a hydrogenation vessel 1.60 metres long and 4.35 centimetres in internal width which is charged with about 2100 cubic centimetres of reduced cobalt or nickel oxide pellets. By fractional distillation of the reaction mixture, the dimethylamine which has not been converted is first obtained and this can be used again after separation of the water and ammonia formed; then at 75° C. and 5 mm. Hg 1-(dimethylamino)-2-aminocyclohexane is obtained as a water-white oil in a yield of 92 percent of the calculated yield.

Similar high yields of the pure compound are obtained by using less dimethylamine and if necessary using methanol or tetrahydrofurane as diluent.

*Example 5*

A solution of 300 parts of 1.2-nitrocyclohexane in 2500 parts of monomethylamine is pumped per hour through the vessel described in Example 4 under a pressure of 250 atmospheres of hydrogen at 60° to 125° C. The excess of amine is separated by distillation under pressure and again subjected to the reaction. The 1-(methylamino)-2-aminocyclohexane obtained in 95 percent of the calculated yield is a water-white liquid which boils at 52° C. at 5 mm. Hg.

*Example 6*

2000 parts by volume of a solution of 300 parts of 1.2-dinitrocyclohexane in 275 parts of methanol and 5000 parts of diethylamine are pumped per hour under 300 atmospheres hydrogen pressure at 80° to 140° C. through the vessel described in Example 4. The 1-(diethylamino)-2-aminocyclohexane obtained in a good yield boils at 106° to 116° C. at 29 mm. Hg.

*Example 7*

A solution of 300 parts of 1.2-dinitrocyclohexane in 3000 parts of hexamethylene imine is pumped hourly through the vessel described in the foregoing examples at 70° to 140° C. under 250 atmospheres hydrogen pressure, and the product worked up as described above. The 1-(hexamethyleneimino)-2-aminocyclohexane obtained in excellent yields boils at 114° C. under 8 mm. Hg.

By using 2500 parts of piperidine per hour instead of the hexamethylene imine, 1-(piperidino)-2-aminocyclohexane is obtained in a yield of 80 percent of the calculated yield; it boils at 115° to 119° C. at 14 mm. Hg.

*Example 8*

A solution of 300 parts of 1.2-dinitrocyclohexane in 3000 parts of pyrrolidine is pumped per hour through the vessel used in Example 4 under 250 atmospheres hydrogen pressure at 93° to 130° C. In this way 1-(pyrrolidyl)-2-aminocyclohexane, which boils at 111° C. at 9 mm. Hg, is obtained in a yield of about 85 percent of the calculated yield.

By using the same amount of morpholine instead of pyrrolidine, 1-morpholino-2-aminocyclohexane of the boiling point 130° to 135° C. at 12 mm. Hg is obtained in a similarly good yield.

*Example 9*

250 parts of a distillation residue from the industrial production of nitrocyclohexane by nitration of cyclohexane with nitric acid and which contains considerable amounts of 1.2-dinitrocyclohexane are dissolved in 2500 parts of liquid dimethylamine. This solution is pumped within 1 hour together with hydrogen at about 300 atmospheres pressure through a vessel of a length of 1.6 metres and an internal width of 4.35 centimetres which is filled with pellets of Raney cobalt and which is heated to 80° to 140° C. By fractional distillation of the continuously obtained hydrogenation mixture, excess dimethylamine and cyclohexylamine pass over as first runnings. Then pure 1-(dimethylamino)-2-aminocyclohexane distils over at 75° C. at 5 mm. Hg. A mixture of polyamino compounds of unknown constitution is obtained as last runnings.

*Example 10*

2000 parts by volume of a solution of 400 parts of 1.2-dinitrocyclohexane in 9500 parts of aniline are pumped per hour through the pressure vessel used in Example 4 under a hydrogen pressure of 300 atmospheres at 70° to 115° C. By fractional distillation of the continuously obtained hydrogenation mixture, 1-(phenylamino)-2-aminocyclohexane, which boils at 140° to 143° C. at 2 mm. Hg, is obtained in an excellent yield. The compound solidifies after a short time to a colorless crystal mass. The aniline recovered as first runnings can be used again. Polyamino compounds of high boiling point and of unknown constitution are obtained as last runnings.

*Example 11*

2000 parts by volume of a solution of 400 parts of 1.2-dinitrocyclohexane in 7500 parts of 28 percent ethylene diamine are pumped per hour through the pressure vessel used in Example 4 under a hydrogen pressure of 300 atmospheres at 70° to 120° C. By fractional distillation of the continuously obtained hydrogenation mixture, 1-(omega-aminoethylamino)-2-aminocyclohexane, which boils at 112° to 115° C. at 4 mm. Hg, is obtained as a colorless oil. The recovered ethylene diamine can be used again. Polyamino compounds of high boiling point and of unknown composition are obtained as last runnings.

What we claim is:

1. A process for the production of 1.2-diaminocyclohexanes of the general formula

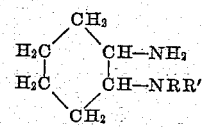

in which NRR' represents a radical of a nitrogenous base selected from the group consisting of ammonia, primary and secondary alkyl, cycloalkyl, aralkyl, aryl and heterocyclic amines, mono- and diethanolamine and ethylene diamine which consists in leading 1.2-dinitrocyclohexane in the liquid phase with an excess of hydrogen and of a nitrogenous base of the general formula HNRR' in which NRR' is defined as above continuously at about 50° to 200° C. under a pressure of about 100 to 300 atmospheres over a hydrogenation catalyst selected from the group consisting of reduced cobalt and nickel oxides and Raney cobalt and nickel.

2. A process for the production of unsubstituted 1.2-diaminocyclohexane which consists in leading 1.2-dinitrocyclohexane in the liquid phase with an excess of hydrogen and of ammonia at about 50° to 200° C. under a pressure of about 100 to 300 atmospheres over a hydrogenation catalyst selected from the group consisting of reduced cobalt and nickel oxides and Raney cobalt and nickel.

3. A process for the production of 1-(dimethylamino)-2-aminocyclohexane which consists in leading 1.2-dinitrocyclohexane in the liquid phase with an excess of hydrogen and of dimethylamine at about 50° to 200° C. under a pressure of about 100 to 300 atmospheres over a hydrogenation catalyst selected from the group consisting of reduced cobalt and nickel oxides and Raney cobalt and nickel.

4. A process for the production of 1-(methylamino)-2-aminocyclohexane which consists in leading 1.2-dinitrocyclohexane in the liquid phase with an excess of hydrogen and of methylamine at about 50° to 200° C. over a hydrogenation catalyst selected from the group consisting of reduced cobalt and nickel oxides and Raney cobalt and nickel.

5. A process for the production of 1-(piperidino)-2-aminocyclohexane which consists in leading 1.2-dinitrocyclohexane in the liquid phase with an excess of hydrogen and of piperidine at about 50° to 200° C. under a pressure of about 100 to 300 atmospheres over a hydrogenation catalyst selected from the group consisting of reduced cobalt and nickel oxides and Raney cobalt and nickel.

6. A process for the production of 1-(phenylamino)-2-aminocyclohexane which consists in leading 1.2-dinitrocyclohexane in the liquid phase with an excess of hydrogen and of aniline at about 50° to 200° C. under a pressure of about 100 to 300 atmospheres over a hydrogenation catalyst selected from the group consisting of reduced cobalt and nickel oxides and Raney cobalt and nickel.

References Cited in the file of this patent

Hall et al.: Journal of the Chemical Society of London for 1945, pp. 694–9, abstracted in Chemical Abstracts, vol. 49, col. 2151(8).

Stoll et al.: Helvetica Chimica Acta, vol. 34, pp. 1937–43 (1951), abstracted in Chemical Abstracts, vol. 47, col. 4294–5, 1953.

Tamemasa: Journal of the Pharmaceutical Society of Japan, vol. 71, pp. 285–89 (1951); abstracted in Chemical Abstracts, vol 46, col. 6650($h$), 1952.